Nov. 10, 1959     E. WEBER     2,911,677
METHOD AND APPARATUS FOR MOULDING FOILS
Filed Oct. 5, 1956
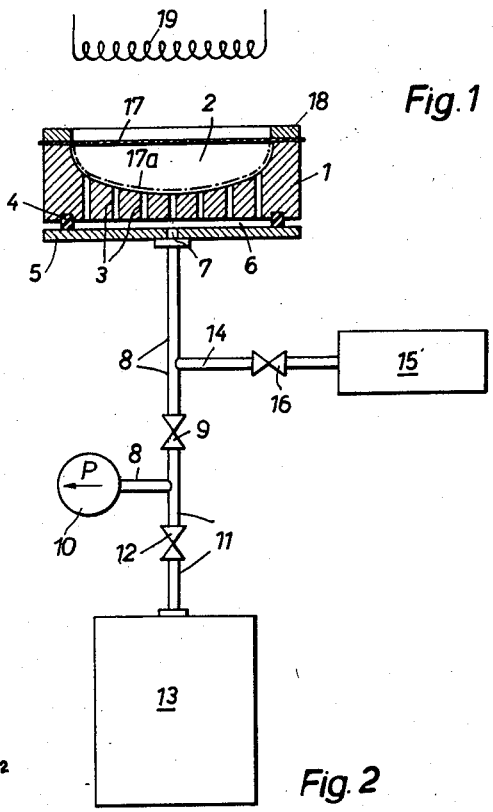
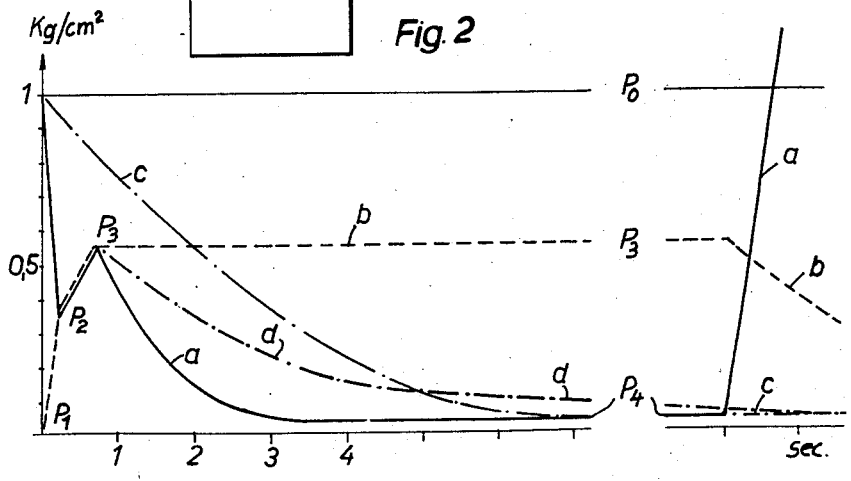
INVENTOR:
E. WEBER

United States Patent Office 2,911,677
Patented Nov. 10, 1959

2,911,677

METHOD AND APPARATUS FOR MOULDING FOILS

Eugen Weber, Zurich, Switzerland, assignor to Hydro-Chemie Aktiengesellschaft, Zurich, Switzerland Application October 5, 1956, Serial No. 614,301

Claims priority, application Switzerland October 5, 1955

7 Claims. (Cl. 18—19)

The present invention relates to a method for drawing foils by vacuum and more particularly to a method in which a thermoplastic foil to be moulded is placed on an open mould so as to define therewith a hermetically closed space, whereupon a vacuum is created in said closed space for drawing the previously heat-softened foil against the walls of said mould.

It has been found that in the vacuum-drawing of foils it is essential that the heat-softened foil is drawn against the walls of the mould within a very short time, in order to prevent the foil material from creeping, which would result in the formation of wrinkles and thin spots in the foil. It is therefore essential to build up the vacuum in said space, that is, to evacuate the air enclosed between the foil and the mould, as quickly as possible.

Moreover, it is important that the vacuum in the said closed space defined by the foil and the mould be maintained throughout the period required by the foil for cooling and solidifying, because otherwise fine details of the shape and surface structure imparted to the foil by the mould when drawn into the latter become lost or blurred.

A further important requirement in such foil-moulding is that after the moulding of one foil the required vacuum be available for renewed application in the moulding of another foil as soon as possible, so that a great number of foils may be moulded on the same mould within a given time in order to keep down the tooling and labor expenditure per moulded foil.

According to one known method which has been proposed for the vacuum moulding of foils, the vacuum in the space between the foil and the mould is set up by opening a valve through which the said space is connected to a container previously evacuated by means of an evacuation pump, and maintaining that valve open until the foil deformed by the vacuum has cooled and solidified. Thus, the vacuum becomes immediately effective in the said space but part of that vacuum is lost because the atmospheric air originally contained in the said space expands into the evacuated container, and the remainder is subsequently displaced into the container as the foil progresses towards the mould wall. Accordingly the vacuum available when the foil contacts the mould wall and subsequently becomes solidified is far from reaching the amount which it had at the beginning of the deformation of the foil. As mentioned above, this impairs the accurate moulding of the foil and moreover, a comparatively long time is required by the evacuating pump for subsequently restoring the initial vacuum in the evacuated container. To avoid these drawbacks, the volume of the evacuated container would have to be very large as compared with the initial volume of the space between the foil and the mould, and the evacuating pump would have to be very powerful, thus making the required apparatus comparatively expensive.

According to another known method, the vacuum in the space between the foil and the mould is produced by an evacuation pump the intake of which is directly connected to the said space through a conduit in which a valve is arranged. After this valve has been opened, the pump evacuates the said space at a rate depending on its output, so that a vacuum in that space is created only gradually; the heat-softened foil thus is drawn against the mould walls rather slowly, so that its material has time to creep and form thin spots and wrinkles as mentioned before. However, a high vacuum results in the said space after the foil has been deformed and it can be maintained up to the moment at which the moulded foil is completely solidified. Also, a container which would have to be evacuated preparatory to each moulding operation is dispensed with.

One object of the present invention is to provide a method of foil-moulding which permits immediate evacuation of the space between the foil and the mould to avoid creeping of the heat-softened foil while being drawn into the mould. Another object of the invention is to provide a method permitting to maintain the vacuum in the space between the foil and the mould substantially at its full value until the foil has cooled and solidified, thus ensuring accurate moulding even of small details of shape and surface structure.

Still a further object of the invention is to provide a method whereby a high vacuum can be made available for the subsequent moulding of a further sheet comparatively soon after the moulding of each foil sheet, so that a high output can be obtained.

Further objects and advantages of the invention will become apparent from the description now to follow, of an embodiment of a moulding apparatus according to the invention, and of the method of operating it. In the accompanying drawing:

Fig. 1 is a simplified and schematical representation of a moulding apparatus according to the invention, and Fig. 2 is a time-pressure diagram illustrating the method of operating said apparatus.

Referring to Fig. 1, 1 designates a mould made for instance from wood, the upper surface of which comprises a moulding recess 2 the shape of which corresponds to that of the outer surface of a cup-shaped article to be obtained by moulding; outside the recess 2, the upper surface of the mould 1 is plane. From the recess 2, numerous small ducts 3 lead to the under face of the mould 1. The latter rests on a frame-shaped sealing gasket 4 supported by a plane supporting plate 5. All the ducts 6 issue into a collecting space 6 which is defined by the mould 1, the gasket 4 and the supporting plate 5. This space 6 communicates with the intake of an evacuating pump 10 through an opening 7 in the supporting plate 5 and a conduit 8 in which a first shut-off valve 9 is arranged.

Between the valve 9 and the pump 10, a conduit 11 in which a second shut-off valve 12 is arranged, branches from the conduit 8 and connects it to a vacuum container 13. The volume of that vacuum container may be about double that of the moulding recess 2. Moreover, a second branch conduit 14 in which a third shut-off valve 16 is arranged leads from an air tank 15 to the portion of the main conduit 8 comprised between its end connected to the supporting plate 5 and the first shut-off valve 9. The air tank 15 contains air compressed above atmospheric pressure and may be connected for its supply to the delivery side of an air compressor (not shown) or of the evacuating pump 10.

In order that the foil 17 to be deformed into the moulded article may be maintained in hermetically sealing contact with the plane upper surface of the mould 1, a metal frame 18 is hinged to the mould 1 in a way not shown. Also a heating device, which may be an electric resistance heater symbolically indicated at 19, is arranged above the mould 1 for heating and thereby softening the foil 17 when the latter is maintained by the frame 18.

The plane foil 17 which is to be moulded is placed onto the upper surface of the mould 1 and secured thereto by means of the frame 18 in such a way that it remains in hermetically sealing contact with the mould around the recess 2 and defines with the mould a closed space within the mould recess 2. Thereupon, the foil 17 is uniformly heated, by means of the heating device 19, to a temperature at which it is soft and deformable. At this stage, the first shut-off valve 9 and the third shut-off valve 16 are closed and the second shut-off valve 12 is open. Acting through the final part of conduit 8 and through the conduit 11 branching therefrom, the evacuating pump 10 maintains a substantial vacuum in the container 13, which vacuum is indicated by $P_1$ in the time-pressure diagram, Fig. 2. In the moulding recess 2 between the foil 17 and the mould 1, the atmospheric pressure $P_0$ prevails, as it does in the ducts 3, the collecting space 6 and the adjacent portion of conduit 8 down to valve 9. Now the heating device 19 is switched off and the shut-off valve 9 is opened, so that the recess 2 communicates with the suction side of the evacuating pump 10 through the ducts 3, the collecting space 6 and the conduit 8 and also with the vacuum container 13 through the branch conduit 11 and the second shut-off valve which is still open. In these intercommunicating spaces the pressure then assumes the value $P_2$ which is comprised between $P_1$ and the atmospheric pressure $P_0$. The atmospheric pressure acting from above on the heat-softened foil 17 therefore depresses the latter into moulding recess 2, whereby air is displaced from the latter into the spaces communicating with it, particularly into the container. Accordingly the pressure in these spaces rises to a value $P_3$ comprised between $P_2$ and the atmospheric pressure $P_0$. The deformation of the foil 17 occurs very rapidly, because both the pressure $P_2$ and the pressure $P_3$ are still substantially below atmospheric pressure. Just before the deformed foil 17 contacts the surface of the mold 1 within the recess 2, as indicated in dash-and-dot lines at 17a (Fig. 1), the second shut-off valve 12 is closed. The evacuation pump 10 then draws most of the remaining air from the space between the foil 17a and the mould surface, which space is now very small, from the ducts 3, the collecting space 6 and the conduit 8, so that the pressure in these spaces comparatively soon drops to a very low value $P_4$ and nearly the full atmospheric pressure $P_0$ is effective from above to press the foil into contact with the mould surface. This very low pressure $P_4$ or high vacuum will now be maintained by the pump 10 until the foil has cooled down and solidified in its deformed shape 17a. Thus, every detail of the mould surface is reproduced or impressed in the shape and surface structure of the foil, which shape and structure become permanent by the solidification of the foil.

Thereupon, the first valve 9 is closed again, the frame 18 is swung clear of the foil, and the third shut-off valve 16 is opened for a short time. Compressed air then flows from the air tank 15 into the mould recess 2 through the branch conduit 14, the upper part of the main conduit 8, the collecting space 6 and the ducts 3; in the mould recess 2, the pressure of that air becomes effective to press the moulded and solidified foil 17a away from the mould surface. As soon as this is done, valve 16 is closed again.

Immediately after the first shut-off valve 9 has been closed, the second shut-off valve 12 is opened to enable the pump 10 to evacuate the container 13 and gradually to restore the initial pressure $P_1$ in it. The volume of that container 13 preferably is in such relation to the output of the evacuation pump 10 that the restoration of the initial pressure $P_1$ does not require a longer time than the removal of the moulded foil from the mould and the placing, securing and heating of another foil on the mould surface, so that there will be no loss of time due to the restoration of the pressure $P_1$ in the container 13 when the operations are carried out cyclically for one foil after the other.

In Fig. 2, the full-line curve *a* indicates the variation of the absolute pressure in the mould recess 2 between the foil and the mould 1, and the dotted curve *b* indicates the variation of the absolute pressure in the vacuum container 13, these pressures being plotted over the time elapsed from the opening of valve 9. It will be seen from these curves that as the valve 9 is opened, the pressure in the mould recess 2 drops from the atmospheric $P_0$ to a value $P_2$ in the order of 0.35 atmosphere, for example, and simultaneously the pressure in the vacuum container 13 rises from its initial value of about 0.05 atmosphere, for example, to that same value $P_2$. While the heat-softened foil is forced into the mould recess 2 within a fraction of a second by the atmospheric pressure acting on the foil from above, the pressure both in the mould recess and in the container 13 rises to the value $P_3$ of about 0.55 atmosphere. After the valve 12 has been closed, the pressure in the container 13 remains constant while that in the mould recess 2 is gradually lowered within a comparatively short time to a value $P_4$ approximately equal to $P_1$, and maintained at that value. After the foil has become solid, the pressure in the mould recess 2 is raised above the atmospheric pressure by opening of the valve 16 connecting it to the compressed air tank 15, and the pressure in the vacuum container 13 is gradually brought down again to $P_1$ by means of the pump 10.

The dash-and-dot curve *c* indicates the variation of the pressure which could be obtained in the mould recess 2 if the vacuum in the latter were produced in known manner merely by an evacuating pump of economically acceptable size without resorting to a vacuum container.

On the other hand, if an evacuating pump of the same size as the pump 10 were used with a vacuum container of the same size as the container 13 but if the said container were maintained in permanent connection with the suction side of the evacuating pump, the pressure in the mould recess would correspond to that indicated by the full-line curve *a* up to the moment at which the pressure $P_3$ is reached. The vacuum container then remaining in communication with the mould recess, the pressure below the foil and in the vacuum container would thereafter decrease at a much slower rate than according to curve *a*, for instance according to the dash-and-dot curve *d*.

Therefore, it will be seen that with the apparatus and mode of operation according to the invention, as described with reference to Fig. 1 and curve *a* of Fig. 2, a sharper drop of pressure in the mould recess is obtained at the beginning than without a vacuum container, as illustrated by curve *c*. In the subsequent phases, in which deformation of the foil is completed and the foil is cooled, the vacuum obtained according to curve *a* is much stronger than that represented by either curve *c* or curve *d*. It will be understood that all the curves of Fig. 2 only show the general character of the variation of the pressures for the various arrangements considered and should not be taken to be quantitatively accurate time-pressure diagrams.

The shut-off valves 9, 12 and 16 may be operable manually or automatically. In the latter case, it is recommendable to have the first valve 9 controlled in such way that it opens at a predetermined time after the heating device 19 is switched in, which time is made sufficient to ensure proper heat-softening of the foil. The second shut-off valve 12 could be closed automatically either a predetermined time after the first valve 9 has been opened, or in response to the pressure in the vacuum container 13, at the moment at which that pressure has risen to the value forecast for $P_3$. Opening of the third valve 16, closing of the first valve 9, and reopening of the second valve 12 are preferably time-controlled to occur a predetermined period after the opening of the first valve 9, which period should be sufficient for the moulded foil 17a to cool and solidify.

In certain cases, the air tank 15 may be omitted and the second branch conduit 14 arranged to permit connection of the uppermost part of conduit 8 to the atmosphere under the control of the third valve 16. With that arrangement, opening of the valve 16 would not cause the moulded foil 17a to be pressed away from the mould 1, but admission of atmospheric pressure to the uppermost part of conduit 8 would cause the pressure on both faces of the moulded foil 17a to be equalized to permit removal of the latter from the mould.

In special cases it may not be absolutely necessary to have a strong vacuum maintaining the deformed foil 17a in contact with the walls of the recess 2 up to the moment at which the foil is cooled down and solidified, or the pump 10 may not be quite powerful enough for restoring the initial vacuum in the container 13 within the desired time between the moment at which one foil has sufficiently cooled down to solidify and the moment at which the valve 9 should be reopened at the beginning of the moulding of another foil meanwhile placed on the mould and heated up. In these cases it might be permissible to close the first shut-off valve 9 shortly after the deformed foil 17a has made contact with the surface of the recess 2.

The pressure in the space between the foil and the mould from that moment of closing the valve 9 and the moment at which the third shut-off valve 16 is opened subsequent to the solidifying of the deformed foil would then remain at little below $P_3$, although it is likely to rise somewhat due to the penetration of air through the foil. Because that pressure would remain at such a comparatively high value, the foil while cooling and solidifying would not be maintained in such an intimate contact with the mould surface as if the said space continued to be evacuated by the pump 10 during that phase. Accordingly, the resulting article will be somewhat less accurately moulded. On the other hand, the second shut-off valve 12 which in this case as well is preferably reopened immediately after valve 9 has been closed, can be reopened for connecting the vacuum container 13 to the evacuating pump 10 much earlier than in the first-described mode of operation, so that more time is available for the pump 10 to restore the initial vacuum in the container 13 and a pump of smaller power may be sufficient.

By way of compromise between the conflicting requirements of accurate moulding and of keeping the power of pump 10 down, it is of course possible to close the valve 9 and reopen the valve 12 at any convenient moment between the intimate contacting of the mould by the deformed foil 17a and the full solidification of that foil.

It will be noted that with the arrangement shown in Fig. 1 the limited area of foil 17 overlying the recess 2 must be drawn out into the deformed foil 17a, so that with this arrangement only particles of limited depth can be produced without excessive thinning of the foil. If articles of greater depth are to be produced, it is preferable to employ a mould having, in place of the recess 2, a bulge the shape of which corresponds to that of the inner or concave side of the article to be obtained. This permits to use an initial area of foil which is much larger and to concentrate it on the bulge in the moulding operation, so that also articles of considerable depth and having extended lateral surfaces can be produced without excessive thinning of the material.

For this purpose, according to an alternative embodiment not shown in the drawing, the supporting plate 5 with the mould 1 resting on it should be vertically displaceable. In this case, the frame 18 should not be mounted on the mould 1, but on a fixed horizontal plate having a central opening slightly greater in all directions than the opening of the frame, so that the latter projects inwardly from the periphery of the opening of the fixed plate above the latter. This arrangement is used in combination with a mould having an upwardly bulging portion in place of the recess 2, surrounded at a distance by a plane rim the peripheral dimensions of which are slightly smaller than those of the opening in the fixed plate but somewhat greater than those of the frame opening.

For moulding a foil on this alternative embodiment of the apparatus, the movable supporting plate and the mould are first lowered so that the top of its bulge is below the upper surface of the fixed plate. The foil is then placed on the fixed plate so as to extend across the opening thereof, and secured to it by means of the frame. Thereupon, the foil is uniformly heated to softening temperature, and when it is sufficiently soft, the supporting plate carrying the mould is raised so that the top of the said bulge comes into contact with the foil and draws it upwards. The supporting plate is moved upwards until the said plane rim of the mould contacts the foil within the opening of the fixed plate and presses it tightly against the inwardly projecting portion of the frame. Thus a closed space is defined on one hand by the foil which is peripherally maintained between the inwardly projecting portion of the frame and the rim of the mould and which runs over the bulge of the latter, and on the other hand by the portion of the surface of the mould which is surrounded by said rim and comprises the said bulge. Now the first shut-off valve 9 is opened so that the said space is evacuated and the whole portion of the foil bounding the said space and extending from the top of the bulge to the said rim is drawn onto the surface of the mould and more particularly of its said bulge. The further steps are as described in connection with the apparatus shown in Fig. 1.

What I claim is:

1. The method of moulding an article from a thermoplastic foil by arranging the said foil on a mould in such a manner that the foil and a surface portion of the mould define together a hermetically closed space, heating the foil to plastifying temperature, evacuating the said space to draw said foil into contact wtih the said surface portion of the mould, and allowing the foil to cool and solidify, comprising the steps of establishing communications between the said space and both an evacuated container and the intake of an evacuating pump, interrupting the communication between the said space and the said container while maintaining the communication between the said space and the intake of said pump, thereafter interrupting the last mentioned communication and establishing a communication between said container and the intake of said pump.

2. The method as claimed in claim 1 in which the communication between the said space and the intake of said pump is interrupted after the foil drawn into contact with the said surface portion of the mould has cooled and solidified.

3. The method as claimed in claim 1 in which the communication between the said space and the intake of said pump is interrupted after the foil has been drawn into contact with the said surface portion of the mould but before it is solidified.

4. The method as claimed in claim 1 comprising the further step of applying at least atmospheric pressure to said space after the foil has cooled and solidified.

5. Apparatus for moulding an article from a thermoplastic foil comprising a mould having ducts issuing in a surface portion thereof, means for securing a foil on said mould in hermetic contact therewith around said surface portion, an evacuating pump, a main conduit connecting said ducts to the intake of said evacuating pump, a first valve in said conduit, a vacuum container, a branch conduit connecting said vacuum container to said main conduit between said first valve and said evacuating pump, and a second valve in said branch conduit.

6. Apparatus as claimed in claim 5 comprising a second branch conduit connecting said main conduit between the said ducts and the said first valve with a space of at least atmospheric pressure, and a third valve in said second branch conduit.

7. Apparatus as claimed in claim 5, comprising a compressed air tank, a second conduit connecting said tank to said main conduit between the said ducts and the said first valve, and a third valve in said second branch conduit.

References Cited in the file of this patent

UNITED STATES PATENTS

| | | |
|---|---|---|
| 2,570,342 | Harrington | Oct. 9, 1951 |
| 2,765,493 | Winstead | Oct. 9, 1956 |
| 2,781,078 | Dovidio | Feb. 12, 1957 |